United States Patent
Lim et al.

(10) Patent No.: US 9,822,252 B2
(45) Date of Patent: *Nov. 21, 2017

(54) FIRE RETARDANT THERMOPLASTIC RESIN COMPOSITION AND ELECTRIC WIRE COMPRISING THE SAME

(71) Applicant: LG CHEM, LTD., Seoul (KR)

(72) Inventors: Sung Hwan Lim, Daejeon (KR); Jong Kuk Choi, Daejeon (KR); Sang Ho Lee, Daejeon (KR); Nam Jib Park, Daejeon (KR); Soo Min Lee, Daejeon (KR); Sung Ho Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 23 days.

This patent is subject to a terminal disclaimer.

(21) Appl. No.: 14/774,945

(22) PCT Filed: Feb. 27, 2015

(86) PCT No.: PCT/KR2015/001908
§ 371 (c)(1),
(2) Date: Sep. 11, 2015

(87) PCT Pub. No.: WO2015/130117
PCT Pub. Date: Sep. 3, 2015

(65) Prior Publication Data
US 2016/0024303 A1 Jan. 28, 2016

(30) Foreign Application Priority Data

Feb. 28, 2014 (KR) .................. 10-2014-0024467
Feb. 26, 2015 (KR) .................. 10-2015-0027250

(51) Int. Cl.
| C08K 5/34 | (2006.01) |
|---|---|
| C08K 5/3492 | (2006.01) |
| B05D 5/12 | (2006.01) |
| H01B 3/30 | (2006.01) |
| H01B 3/44 | (2006.01) |
| H01B 7/295 | (2006.01) |
| C08L 71/12 | (2006.01) |
| C08L 23/04 | (2006.01) |
| C08K 5/49 | (2006.01) |
| C08K 5/5353 | (2006.01) |
| C08L 25/04 | (2006.01) |
| C08L 53/02 | (2006.01) |

(52) U.S. Cl.
CPC ............... *C08L 71/12* (2013.01); *C08K 5/49* (2013.01); *C08K 5/5353* (2013.01); *C08L 23/04* (2013.01); *C08L 25/04* (2013.01); *H01B 7/295* (2013.01); *C08L 53/025* (2013.01); *C08L 2201/02* (2013.01); *C08L 2203/202* (2013.01); *C08L 2205/03* (2013.01); *C08L 2207/04* (2013.01)

(58) Field of Classification Search
None
See application file for complete search history.

(56) References Cited

U.S. PATENT DOCUMENTS

| 2002/0137840 A1 | 9/2002 | Adedeji et al. |
| 2007/0261878 A1 | 11/2007 | Kosaka et al. |
| 2009/0088501 A1 | 4/2009 | Qiu et al. |
| 2013/0253105 A1 | 9/2013 | Shan |
| 2014/0234619 A1* | 8/2014 | Shan ............... C08K 3/38 428/366 |

FOREIGN PATENT DOCUMENTS

| CN | 101107317 A | 1/2008 |
| CN | 101495565 A | 7/2009 |
| CN | 101663356 A | 3/2010 |
| JP | 2001-98103 A | 4/2001 |
| JP | 2010-520329 A | 6/2010 |
| JP | 2010-540716 A | 12/2010 |
| JP | 2013-161590 A | 8/2013 |
| KR | 10-2010-0012229 A | 2/2010 |
| KR | 10-2012-0023109 A | 3/2012 |
| WO | WO 2010/030478 A2 * | 3/2010 |

* cited by examiner

*Primary Examiner* — Robert T Butcher
(74) *Attorney, Agent, or Firm* — Dentons US LLP

(57) ABSTRACT

Disclosed are a fire retardant thermoplastic resin composition suitable for preparing an electric wire, etc. by enhancing extrudability of a resin composition without hindering fire retardancy of the resin composition, and an electric wire comprising the same. The fire retardant thermoplastic resin composition comprises a matrix resin that comprises 20 to 35% by weight of a poly arylene ether resin, 20 to 35% by weight of a vinyl aromatic resin and 5 to 20% by weight of an olefin-based resin comprising a rubber ingredient, 1 to 10% by weight of a room-temperature liquid-type fire retardant, and 8 to 20% by weight of an ancillary fire retardant, based on 100% by weight of a mixture of a poly arylene ether resin, a vinyl aromatic resin, an olefin-based resin, a room-temperature liquid-type fire retardant and an ancillary fire retardant.

9 Claims, No Drawings

FIRE RETARDANT THERMOPLASTIC RESIN COMPOSITION AND ELECTRIC WIRE COMPRISING THE SAME

This application is a National Stage Entry of International Application No. PCT/KR2015/001908, filed Feb. 27, 2015, and claims the benefit of the priority to Korean Application No. 10-2014-0024467, filed Feb. 28, 2014 and Korean Application No. 10-2015-0027250, filed Feb. 26, 2015, all of which are incorporated by reference in their entirety for all purposes as if fully set forth herein.

TECHNICAL FIELD

The present invention relates to a fire retardant thermoplastic resin composition and an electric wire comprising the same. More particularly, the present invention relates to a fire retardant thermoplastic resin composition suitable for preparing an electric wire, etc. by enhancing extrudability of a resin composition without hindering fire retardancy of the resin composition, and an electric wire comprising the same.

BACKGROUND ART

Attempts to substitute polyvinyl chloride (PVC) with other materials are actively underway in a variety of industries. However, development of proper substitutes is limited due to various reasons related to fire retardancy as one advantage of polyvinyl chloride. In particular, in preparing electric wires such as cables, it is not easy to realize fire retardancy of polyvinyl chloride using a substitute for polyvinyl chloride.

Regulations regarding fire retardancy are based on UL (Underwriters Laboratories) standards, and, in preparing a resin composition, particularly a thermoplastic resin composition, having suitable fire retardancy satisfying UL standards, a halogen-based fire retardant and a fire retardant are generally kneaded in a thermoplastic resin. Polybromodiphenylether, tetrabromobisphenol A, an epoxy compound with a bromine substituent, chlorinated polyethylene, etc. have been mainly used as the halogen-based fire retardant. As the fire retardant, antimony-based compounds are used and, thereamong, antimony trioxide and antimony pentoxide are generally used.

As described above, when fire retardancy is provided to a thermoplastic resin by applying a halogen-based fire retardant and antimony-based fire retardant together, excellent fire retardancy is exhibited and a thermoplastic resin composition, which may produce final products without almost no property deterioration, may be prepared. However, upon processing, hydrogen halide gas is generated and thus a mold may be damaged. In addition, upon discarding, dioxin having strong carcinogenicity is discharged from a waste incinerator due to the presence of a halogen compound, thus harmfully affecting the environment and the human body. Furthermore, regulations on use of halogen-based fire retardant resin materials are actively applied in Europe, and thus, development of a fire retardant thermoplastic resin composition not comprising halogen is required.

In order to provide fire retardancy to a thermoplastic resin composition not comprising halogen, aromatic phosphorus-based ester compounds are generally used. When such a phosphorus-based ester compound is applied alone, heat resistance of a thermoplastic resin is decreased and it is difficult to accomplish desired fire retardancy. Accordingly, in order to enhance heat resistance of a thermoplastic resin and provide fire retardancy thereto, a method of applying a phosphoric ester compound blended with polyphenylene ether has been suggested and studied.

In an embodiment, Korean Patent Application Pub. No. 10-2013-0121152 discloses a polyphenyl ether elastomer composition. The polyphenyl ether elastomer composition comprises 10 to 46 parts by weight of polyphenylether, 3 to 5 parts by weight of polystyrene, 3 to 5 parts by weight of polystyrene having superior impact resistance, 6 to 13 parts by weight of polyolefin elastomer, 13 to 23 parts by weight of a hydrogenated styrene-butadiene block copolymer, 6 to 16 parts by weight of low-density polyethylene, 5 to 8 parts by weight of a low-density polyethylene graft polystyrene copolymer and 18 to 20 parts by weight of a phosphate fire retardant. In addition, Korean Patent Application Pub. No. 10-2010-0017356 discloses a fire retardant thermoplastic composition and a product comprising the same. The fire retardant thermoplastic composition comprises poly(arylene ether), block copolymer, liquid polyolefin and a fire retardant additive. The fire retardant additive composition comprises phosphate selected from the group consisting of metal hydroxide, organic phosphate and melamine phosphate, melamine pyrophosphate, melamine orthophosphate, melem polyphosphate, melam polyphosphate, diammonium phosphate, monoammonium phosphate, amide phosphate, melamine polyphosphate, ammonium polyphosphate, amide phosphate and a combination of two or more thereof.

Poly arylene ether comprising the polyphenylene ether is an amorphous resin and has advantages such as superior fire retardancy, insulating properties, heat resistance, rigidity, etc. Poly arylene ether modified from the poly arylene ether has substantial advantages in regard to fire retardancy. However, since poly arylene ether has high processing temperature, fire retardant types which may be used are greatly limited. In addition, when a fire retardant is added, in an amount of greater than a certain range, to a thermoplastic resin composition comprising the polyphenylarylene ether, there are problems in dispersion of a fire retardant upon processing into electric wires such as cables, and a fire retardant is protruded to a surface of a product that is processed and molded, thereby deteriorating product appearance and quality. Accordingly, the total amount of a fire retardant added is limited. In particular, upon extrusion, various problems related to appearance are more likely to occur.

Therefore, there is still a need for development of a fire retardant thermoplastic resin composition that is suitable for preparation of an electric wire, etc. by addressing conventional problems and enhancing extrudability of a resin composition without decreasing fire retardancy of the resin composition.

DISCLOSURE

Technical Problem

Therefore, the present invention has been made in view of the above problems, and it is one object of the present invention to provide a fire retardant thermoplastic resin composition that may realize superior fire retardancy while decreasing negative effects on appearance or properties upon manufacturing electric wires such as cables by minimizing the content of solid-phase fire retardant and comprising a fire retardant that may plasticize a resin composition.

It is another object of the present invention to provide a fire retardant thermoplastic resin composition suitable for preparing an electric wire, etc. by enhancing extrudability of a resin composition without hindering fire retardancy of the resin composition.

It is yet another object of the present invention to provide a fire retardant article, particularly an electric wire such as a cable, comprising the fire retardant thermoplastic resin composition.

Technical Solution

In accordance with one aspect of the present invention, provided is a fire retardant thermoplastic resin composition comprising a matrix resin that comprises 20 to 35% by weight of a poly arylene ether resin, 20 to 35% by weight of a vinyl aromatic resin and 5 to 20% by weight of an olefin-based resin, 1 to 10% by weight of a room-temperature liquid-type fire retardant, and 8 to 20% by weight of an ancillary fire retardant, based on 100% by weight of a mixture of a poly arylene ether resin, a vinyl aromatic resin, an olefin-based resin, a room-temperature liquid-type fire retardant and an ancillary fire retardant.

The olefin-based resin may be selected from the group consisting of low-density polyethylene (LDPE), high-density polyethylene (HDPE), polypropylene and mixtures of two or more thereof.

The room-temperature liquid-type fire retardant may be a room-temperature liquid-type phosphorus-based fire retardant.

The room-temperature liquid-type phosphorus-based fire retardant may be selected from the group consisting of bisphenol-A-diphenyl phosphate (BPADP), triphenyl phosphate (TPP), resorcinol bis-diphenyl phosphate (RDP) and mixtures of two or more thereof.

The ancillary fire retardant may comprise 7 to 15% by weight of a nitrogen-based fire retardant.

The nitrogen-based fire retardant may be melamine polyphosphate.

The ancillary fire retardant may comprise 1 to 5% by weight of a second phosphorus-based fire retardant other than the room-temperature liquid-type phosphorus-based fire retardant.

The second phosphorus-based fire retardant may be metal phosphate, preferably aluminum dialkyl phosphate.

Advantageous Effects

As apparent from the foregoing, the present invention advantageously provides a fire retardant thermoplastic resin composition suitable for preparing an electric wire, etc. by enhancing extrudability of a resin composition without hindering fire retardancy of the resin composition, and an electric wire comprising the same.

BEST MODE

Hereinafter, the present invention is described in more detail.

A fire retardant thermoplastic resin composition according to the present invention comprises a matrix resin that comprises 20 to 35% by weight of a poly arylene ether resin, 20 to 35% by weight of a vinyl aromatic resin and 5 to 20% by weight of an olefin-based resin, 1 to 10% by weight of a room-temperature liquid-type fire retardant, and 8 to 20% by weight of an ancillary fire retardant, based on 100% by weight of a mixture of a poly arylene ether resin, a vinyl aromatic resin, an olefin-based resin, a room-temperature liquid-type fire retardant and an ancillary fire retardant.

The poly arylene ether resin provides heat resistance and fire retardancy to the resin composition according to the present invention and is a homopolymer of a compound represented by Formula 1 below or a copolymer comprising a compound of Formula 1 below.

$$-Ar_1(R_1R_2R_3R_4)-O-$$ [Formula 1]

wherein $R_1$, $R_2$, $R_3$ and $R_4$ are a substituent of aryl (Ar), and are each independently or simultaneously chlorine, bromine, iodine, methyl, ethyl, propyl, allyl, phenyl, methylbenzyl, chloromethyl, bromomethyl, cyanoethyl, cyano, methoxy, phenoxy or a nitro group, and Ar is C6 to C20 aryl. Particularly, in Formula 1, $R_1$ and $R_2$ are alkyl, particularly a C1 to C4 alkyl polymer, and a polymerization degree is preferably 50 or more. As a homopolymer of the poly arylene ether resin, poly(2,6-dimethyl-1,4-phenylene)ether, poly(2,6-diethyl-1,4-phenylene)ether, poly(2-methyl-6-propyl-1,4-phenylene)ether, poly(2,6-dipropyl-1,4-phenylene)ether, poly(2-ethyl-6-propyl-1,4-phenylene)ether, poly(2,6-dimethoxy-1,4-phenylene)ether, poly(2,6-dichloromethyl-1,4-phenylene)ether, poly(2,6-dibromomethyl-1,4-phenylene)ether or poly(2,6-diphenyl-1,4-phenylene)ether, or poly(2,5-dimethyl-1,4-phenylene)ether may be used. However, the compounds are merely listed for illustrative purposes and it is not intended to limit the present invention thereto. In addition, a copolymer of 2,6-dimethylphenol and 2,3,6-trimethylphenol, or a polyphenylene ether copolymer having a polyphenylene ether structure as a main chain such as a copolymer of 2,6-dimethylphenol and o-cresol or a copolymer of 2,3,6-trimethylphenol and o-cresol may be used as a copolymer of the poly arylene ether resin. However, the compounds are merely listed for illustrative purposes and it is not intended to limit the present invention thereto. In particular, poly(2,6-dimethyl-1,4-phenylene)ether having an intrinsic viscosity of 0.25 to 0.50 dl/g (measured under conditions of 0.5 g/dl, chloroform solution and 30° C.) is preferably used as the polyphenylene ether-based resin. As the polyphenylene ether resin, a modified polyphenylene ether resin obtained by reacting α,β-unsaturated carboxylic acid or derivatives thereof, styrene or derivatives thereof, or unsaturated carboxylic acid or derivatives thereof with the homopolymer or the copolymer of the polyphenylene ether into a melted state, a solution state or a slurry state at 30 to 350° C. in the presence or absence of an initiator, other than the homopolymer and the copolymer of the polyphenylene ether, may be used.

When the poly arylene ether resin is used in an amount of 20 to 35% by weight, preferably 25 to 33% by weight, more preferably 28 to 30% by weight based on the total amount of the resin composition according to the present invention, fire retardancy and heat resistance may be advantageously provided to the resin composition according to the present invention.

As the poly arylene ether resin, a polyphenylene ether resin represented by Formula 2 below may be preferably used.

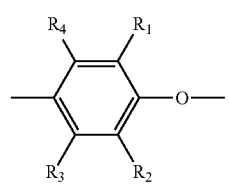

[Formula 2]

wherein $R_1$, $R_2$, $R_3$ and $R_4$ are each independently or simultaneously chlorine, bromine, iodine, methyl, ethyl, propyl, allyl, phenyl, methylbenzyl, chloromethyl, bromomethyl, cyanoethyl, cyano, methoxy, phenoxy or a nitro group. Particularly, in Formula 2, $R_1$ and $R_2$ are alkyl, particularly a C1 to C4 alkyl polymer, and a polymerization degree is preferably 50 or more. As a homopolymer of the poly (phenylene ether) resin, poly(2,6-dimethyl-1,4-phenylene) ether, poly(2,6-diethyl-1,4-phenylene)ether, poly(2-methyl-6-propyl-1,4-phenylene)ether, poly(2,6-dipropyl-1,4-phenylene)ether, poly(2-ethyl-6-propyl-1,4-phenylene) ether, poly(2,6-dimethoxy-1,4-phenylene)ether, poly(2,6-dichloromethyl-1,4-phenylene)ether, poly(2,6-dibromomethyl-1,4-phethylene)ether or poly(2,6-diphenyl-1,4-phenylene)ether, or poly(2,5-dimethyl-1,4-phenylene) ether may be used. In addition, a copolymer of 2,6-dimethylphenol and 2,3,6-trimethylphenol, or a polyphenylene ether copolymer having a polyphenylene ether structure as a main chain such as a copolymer of 2,6-dimethylphenol and o-cresol or a copolymer of 2,3,6-trimethylphenol and o-cresol may be used as a copolymer of the poly(phenylene ether) resin. In particular, poly(2,6-dimethyl-1,4-phenylene)ether having an intrinsic viscosity of 0.25 to 0.50 dl/g (measured under conditions of 0.5 g/dl, chloroform solution and 30° C.) is preferably used as the polyphenylene ether-based resin. As the polyphenylene ether resin, a modified polyphenylene ether resin obtained by reacting α,β-unsaturated carboxylic acid or derivatives thereof, styrene or derivatives thereof, or unsaturated carboxylic acid or derivatives thereof with the homopolymer or the copolymer of the polyphenylene ether into a melted state, a solution state or a slurry state at 30 to 350° C. in the presence or absence of an initiator, other than the homopolymer and the copolymer of the polyphenylene ether, may be used.

When the polyphenylene ether resin is used in an amount of 20 to 35% by weight, preferably 25 to 33% by weight, more preferably 28 to 30% by weight based on the total amount of the resin composition according to the present invention, fire retardancy and heat resistance may be advantageously provided to the resin composition according to the present invention.

The vinyl aromatic resin may be a homopolymer of a vinyl aromatic monomer selected from the group consisting of a vinyl aromatic monomer, preferably styrene, α-methylstyrene, p-methylstyrene, vinyltoluene, t-butylstyrene and mixtures of two or more thereof, or a vinyl-based monomer copolymerizable with the vinyl aromatic monomer, preferably olefins such as vinyl acetate, acrylates, methacrylates, ethylene or propylene, unsaturated fatty acids such as acrylic acid, methacrylic acid, itaconic acid or maleic acid, anhydrides of the fatty acids, or those broadly used in copolymerization of vinyl chloride. In particular, examples of a comonomer having an unsaturated double-bond comprise ethylacrylate, ethylmethacrylate, n-propyl acrylate, n-propyl methacrylate, isopropyl acrylate, isopropyl methacrylate, sec-butylacrylate, sec-butyl ethacrylate, isobutyl acrylate, isobutyl ethacrylate, 2-ethylhexylacrylate, 2-ethylhexylmethacrylate, lauryl acrylate, lauryl methacrylate, stearyl acrylate and stearylmethacrylate. Examples of a comonomer containing an epoxy group comprise glycidyl acrylate and glycidyl methacrylate, examples of a comonomer containing a carboxyl group comprise acrylic acid, methacrylic acid, itaconic acid, fumaric acid and maleic acid, and examples of a comonomers containing a hydroxyl group comprise 2-hydroxyethylacrylate, 2-hydroxyethylmethacrylate, 2-hydroxypropylacrylate, 2-hydroxypropyl methacrylate, 2-hydroxybutylacrylate and 2-hydroxybutyl ethacrylate. However, the comonomers may be copolymers with vinyl-based monomers not described above. The vinyl aromatic resin may be preferably a styrene-based polymer or a styrene-based copolymer, more preferably an SEBS-based block copolymer. The SEBS-based block copolymer is prepared by block-copolymerizing styrene, ethylene and butylene as monomers and is preferably a linear polymer. Here, a weight ratio of styrene/rubber ingredient is 10 to 50/50 to 90. Here, the rubber ingredient means a portion composed of ethylene and butylene. Such an SEBS-based block copolymer may have a Shore A hardness of 45 to 70. The hardness may proportionally increase according to increase of the content of the vinyl aromatic monomer. For example, an SEBS-based block copolymer (SBC 1) comprising 13% by weight of styrene (styrene/rubber ingredient=13/87) may have a Shore A hardness of 47 and an SEBS-based block copolymer (SBC 2) comprising 42% by weight of styrene (styrene/rubber ingredient=42/58) may have a Shore A hardness of 65, but the present invention is not limited thereto. When the vinyl aromatic resin is used in an amount of 20 to 35% by weight, preferably 25 to 33% by weight, more preferably 28 to 31.5% by weight based on the total amount of the resin composition according to the present invention, a molded product obtained using the resin composition may exhibit increased flexibility, properties of a resin composition are stabilized by increasing compatibility between the poly arylene ether resin and the olefin-based resin, and fire retardancy may be effectively enhanced and may have market competitiveness.

The olefin-based resin is preferably a homopolymer of an olefin-based monomer or and a copolymer of an alpha olefin comonomers and an olefin-based monomer. Examples of the olefin-based monomer comprise ethylene, propylene, butene, pentene, hexene, octene, decene, dodecene, tetradecene, hexadecene, octadecene, eicosene, etc., but the present invention is not limited thereto. As a comonomer used in the copolymerization, $C_4$ or higher alpha-olefins may be used. As the $C_4$ or higher alpha-olefins, 1-butene, 1-pentene, 1-hexene, 4-methyl-1-pentene, 1-octene, 1-decene, 1-dodecene, 1-tetradecene, 1-hexadecene, 1-octadecene, 1-eicosene, or the like may be used, but the present invention is not limited thereto. Thereamong, $C_4$ to $C_{10}$ alpha-olefins are preferable, and one or more alpha olefin types may be used as a comonomer. The content of ethylene in the olefin-based copolymer is preferably 55 to 99% by weight, more preferably 65 to 98% by weight, most preferably 70 to 96% by weight. The amount of $C_4$ or more alpha-olefin is preferably 1 to 45% by weight, more preferably 2 to 35% by weight, most preferably 4 to 20% by weight. The olefin-based polymer may be prepared by polymerizing while continuously supplying ethylene and $C_4$ or higher alpha-olefin as a comonomer in a constant ratio using a continuous slurry polymerization reactor, a loop slurry reactor, a gas-phase reactor, or a solution reactor. The olefin-based resin is preferably selected from the group consisting of low-density polyethylene (LDPE), high-density polyethylene (HDPE), polypropylene and mixtures of two or more thereof, more preferably a polypropylene resin. The low-density polyethylene (LDPE) may be polyethylene having a density of 0.915 to 0.920 $g/cm^3$, and the high-density polyethylene (HDPE) may be polyethylene having a density of 0.941 to 0.965 $g/cm^3$. When the polypropylene resin comprising the rubber ingredient is used in an amount of 5 to 20% by weight, preferably 8 to 18% by weight, more preferably 10 to 15% by weight, based on the total amount of the resin composition according to the present invention, the contents of other expensive resins constituting the resin composition are lowered and thus economic efficiency increases. In addition, flexibility of a molded product obtained using the resin composition is increased, and compatibility between the poly arylene ether resin and the vinyl aromatic resin in the resin composition is effectively increased.

The resin composition according to the present invention comprises the matrix resin comprising the poly arylene ether resin, the vinyl aromatic resin and the olefin-based resin, described above, the matrix resin constitutes sheathing of electric wires such as cables. In particular, the present invention further comprises special fire retardants to enhance fire retardancy and processability of the matrix resin.

The resin composition according to the present invention comprises a matrix resin that comprises the poly arylene ether resin, the vinyl aromatic resin and the olefin-based resin, described above. The matrix resin constitutes sheaths of electric wires comprising cables. In particular, the present invention further comprises fire retardants for simultaneously enhancing fire retardancy and processability to the resin of the matrix.

The room-temperature liquid-type fire retardant means a fire retardant that is a liquid at room-temperature (23° C.). The room-temperature liquid-type fire retardant provides fire retardancy to the resin composition according to the present invention and controls a melt index (MI) while maintaining a liquid state at room-temperature. Accordingly, even when the minimum amount of fire retardant is used in the resin composition according to the present invention, fire retardancy is stably satisfied and, at the same time, productivity is enhanced. In addition, appearance and problems in processing of obtained wires may be addressed. The room-temperature liquid-type fire retardant may be preferably a room-temperature liquid-type phosphorus-based fire retardant, and may be more preferably selected from the group consisting of bisphenol-A-diphenyl phosphate (BPADP), triphenyl phosphate (TPP), resorcinol bis-diphenyl phosphate (RDP) and mixtures of two or more thereof. When the room-temperature liquid-type fire retardant is comprised in an amount of 1 to 10% by weight, preferably 3 to 8% by weight, more preferably 4 to 8% by weight, most preferably 4 to 7% by weight based on the total weight of the resin composition according to the present invention, a melt index and productivity of an obtained resin composition are effectively enhanced and a molded product effectively exhibits superior appearance and fire retardancy.

The ancillary fire retardant may be a general fire retardant for providing fire retardancy to synthetic resins or resin compositions. When the fire retardant is used in an amount of 8% to 20% by weight based on the total amount of the resin composition according to the present invention, the resin composition according to the present invention may be provided with superior fire retardancy.

The ancillary fire retardant may preferably comprise a nitrogen-based fire retardant. The nitrogen-based fire retardant may effectively provide superior fire retardancy to the resin composition obtained according to the present invention. Examples of the nitrogen-based fire retardant comprise melamine or melamine derivatives. Specific examples of the nitrogen-based fire retardant comprise melamine, melamine cyanurate, melem-phosphate reaction products or mixtures thereof, namely, melamine phosphate, melamine pyrophosphate, melamine polyphosphate, etc., but the present invention is not limited thereto. When the nitrogen-based fire retardant is used in an amount of 7% to 15% by weight, preferably 9% to 14% by weight, more preferably 10 to 13% by weight based on the total amount of the resin composition according to the present invention, superior fire retardancy may be effectively provided while satisfactorily maintaining tensile strength and elongation.

The ancillary fire retardant may be a second phosphorus-based fire retardant other than the room-temperature liquid-type phosphorus-based fire retardant. The second phosphorus-based fire retardant may be a general fire retardant used to provide fire retardancy to a synthetic resin or a resin composition. Preferably, a halogen-based fire retardant is not used to provide eco-friendly fire retardancy, and other phosphorus-based fire retardants except for red phosphorus among phosphorus-based fire retardants may be used. The phosphorus-based fire retardant may be a powder, particularly may be selected from the group consisting of, for example, phosphate ester compounds, phosphates, pyrophosphates, phosphonates, metal-substituted phosphinates, phosphanates, metal phosphate and mixtures of two or more thereof. Preferably, the phosphate ester compound is a monomer having an aromatic group and is selected from the group consisting of particularly trimethylphosphate, triethylphosphate, tributylphosphate, trioctylphosphate, triphenylphosphate, tricresylphosphate, trixylenylphosphate, cresyldiphenylphosphate, octyl diphenylphosphate and aromatic diphosphate having a structure of Formula 3 below.

[Formula 3]

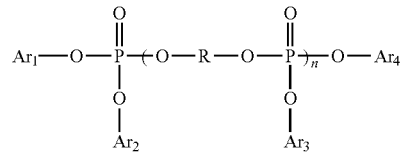

wherein $Ar_1$, $Ar_2$, $Ar_3$ and $Ar_4$ are the same or different, each of which is phenyl or aryl substituted with one to three C1 to C4 alkyl, R is phenyl or bisphenol-A, and n is 1 to 5. When the second phosphorus-based fire retardant is used in an amount of 1% to 5% by weight, preferably 2% to 4% by weight, more preferably 2.3% to 3.5% by weight based on the total amount of the resin composition according to the present invention, superior fire retardancy and heat resistance are effectively provided.

In an embodiment, the metal phosphate may be aluminium phosphate, zinc phosphate or a mixture thereof, preferably aluminum dialkyl phosphate, zinc dialkyl phosphate or a mixture thereof.

In an embodiment, the fire retardant thermoplastic resin composition according to the present invention may have a melt index of 40 to 150 g/10 min., 45 to 110 g/10 min or 47 to 90 g/10 min. Within this range, superior extrudability and cable surface characteristics are exhibited.

In addition, the fire retardant thermoplastic resin composition according to the present invention may further comprise additives such as a lubricant, a thermostabilizer, an antioxidant, a light stabilizer, an anti-dripping agent, a pigment and an organic filler generally used in a resin composition within a range within which properties such as fire retardancy of the obtained resin composition are not greatly affected.

In addition, examples of a kneading apparatus which may be used in the present invention comprise a Banbury mixer, a single-screw extruder, a twin-screw extruder, a Buss kneader, etc. A continuous kneading apparatus is more preferable than a batch-type kneading apparatus. In particular, ingredients of the resin composition are melted/kneaded at 200 to 290° C. and extrusion-processed, as needed, dried, preferably 70 to 90° C. for two to eight hours. Subsequently, the resin composition may be used to prepare a molded product through processing such as vacuum molding, low-pressure molding, hollow molding, extrusion coating, foam extrusion, etc., preferably extrusion-molding under strong shear stress at 230 to 260° C. using extrusion equipment. In particular, the molded product may be used in preparing electric wires comprising cables.

Although the preferred embodiments of the present invention are disclosed for illustrative purposes, those skilled in the art will appreciate that various modifications, additions and substitutions are possible, without departing from the scope and spirit of the invention as disclosed in the accompanying claims.

EXAMPLE

Examples 1 to 5, Comparative Examples 1 to 4 and Reference Examples 1 to 2

Mixing was carried out according to ingredients and contents summarized in Table 1 below. Subsequently, a twin-screw extruder was set to 240 to 250° C. (temperature of feeder, to which materials are input, was set to 240° C. and the other parts were set to 250° C.), and extrusion was carried out by melting/kneading. Finally, drying was performed at 80° C. for four hours after pelletizing, and then the dried pellet was stood at room-temperature for one day. Subsequently, using a 9Φ HAAKE extruder manufactured by Thermo Scientific (Germany) as a wire coating extruder, a cable was extruded (extrusion conditions: temperature was set to 240 to 250° C. (a feeder (to which materials are input) was set to 240° C., other devices were set to 250° C.), and speed was set to 80 rpm, 30 m/min) was performed. Properties of produced specimens were evaluated and results are summarized in Table 1 below.

Property evaluation was carried out as follows:
Cable appearance evaluation: Evaluated with the naked eye according to a method described in UL 1581
Tensile strength and elongation: Measured according to a method described in UL 1581
Fire retardancy (VW-1): Measured according to a method described in UL 1581
Hardness (Shore A): Measured according to a method described in ASTM D 2240
Melt index (g/10 min): Measured for one minute after standing for four minutes under a load of 10 kg at 250□ and calculated according to ASTM D1238

In addition, abbreviations of ingredients in Table 1 below are as follows:
PPE: polyphenylene ether; PX-100F manufactured by Mitsubishi Engineering Plastic (MEP), Japan
SBC 1: styrene block copolymer; SEBS G 1657 (styrene content: 13%) manufactured by Kraton, USA
SBC 2: styrene block copolymer; SEBS A 1536 (styrene content: 42%) manufactured by Kraton, USA
PP: polypropylene; EC5082 (ethylene butadiene rubber (EBR) content: 7%, melt index: 23 g/10 min.) manufactured by PolyMirae, Republic of Korea
FR1: OP 1230 (phosphorus content: 23% to 24%) as metal phosphate, aluminum diethylphosphate, used as a second phosphorus-based fire retardant, manufactured by Clariant, Japan
FR2: NONFLA 601 (nitrogen content: 39% to 42%, phosphorus content: 14% to 17%) as melamine polyphosphate used as nitrogen-based fire retardant), manufactured by DOOBON, Republic of Korea
FR3: (Adeka) FP-600 as bisphenol-A-diphenylphosphate (BPADP), a liquid phosphorus-based fire retardant that is liquid at room temperature, manufactured by ADEKA, Japan

TABLE 1

| | Classification | | | | | | | | | | |
|---|---|---|---|---|---|---|---|---|---|---|---|
| | Examples | | | | | Comparative Examples | | | | Reference Examples | |
| Classification | 1 | 2 | 3 | 4 | 5 | 1 | 2 | 3 | 4 | 1 | 2 |
| PPE | 29 | 29 | 33 | 33 | 29 | 29 | 29 | 29 | 29 | 29 | 29 |
| SBC 1 | 11.7 | 11.7 | 11.7 | 11.7 | 11.7 | 11.7 | 11.7 | 11.7 | 11.7 | 11.7 | 11.7 |
| SBC 2 | 19.7 | 19.7 | 19.7 | 19.7 | 19.7 | 19.7 | 19.7 | 19.7 | 19.7 | 19.7 | 19.7 |
| PP | 12.8 | 12.8 | 12.8 | 12.8 | 12.8 | 12.8 | 12.8 | 12.8 | 12.8 | 12.8 | 12.8 |
| FR1 | 3.4 | 2.5 | 2.5 | 2.5 | 2.5 | — | 3.4 | 7 | 8.4 | 3.4 | 3.4 |
| FR2 | 12 | 12 | 12 | 12 | 12 | 11 | 12 | 12 | 12 | 12 | 17 |
| FR3 | 5 | 7 | 5 | 4 | 9 | 15 | — | — | — | 3 | 3 |
| Additive | 6.4 | 5.3 | 3.3 | 4.3 | 3.3 | 0.8 | 11.4 | 7.8 | 6.4 | 8.4 | 3.4 |
| Cable extrusion characteristics | | | | | | | | | | | |
| Extrudability | ◎ | ○ | ◎ | ○ | Δ | X | X | X | ○ | ○ | Δ |
| Cable surface | ◎ | ◎ | ◎ | ◎ | ○ | Δ | X | X | X | Δ | Δ |
| Mechanical characteristics of cable specimens | | | | | | | | | | | |
| Melt index (250° C./10 kg) | 63 | 83 | 61 | 47 | 107 | 162 | 40 | 24 | 23 | 49 | 46 |
| Tensile strength (room-temperature T/S) | 251 | 222 | 261 | 247 | 216 | 201 | 238 | 232 | 212 | 174 | 174 |
| Elongation (room-temperature T/E) | 211 | 207 | 217 | 222 | 177 | 154 | 201 | 187 | 169 | 224 | 146 |

TABLE 1-continued

| | Classification | | | | | | | | | | |
|---|---|---|---|---|---|---|---|---|---|---|---|
| | Examples | | | | | Comparative Examples | | | | Reference Examples | |
| Classification | 1 | 2 | 3 | 4 | 5 | 1 | 2 | 3 | 4 | 1 | 2 |
| Hardness | 87 | 89 | 88 | 88 | 91 | 93 | 89 | 90 | 90 | 86 | 91 |
| Fire retardancy | Pass | Pass | Pass | Pass | Pass | Pass | Fail | Fail | Fail | Fail | Fail |

\* Extrudability and cable surface: Classified into four steps (◎, ○, Δ, X) based on appearance quality and productivity upon cable extrusion.
\* Properties except for melt index and hardness were measured using cable specimens based on UL 1581.
\* The additive comprises oil, an antioxidant (A/O), a lubricant, etc.

As shown in Table 1, it can be confirmed that the resin compositions (Examples 1 and 5) according to the present invention have a proper melt index and superior fire retardancy. In addition, it can be confirmed that other mechanical properties such as tensile strength and elongation are superior, and thus, the resin compositions may be particularly useful in preparation of electric wires comprising cables requiring simultaneously both processability and fire retardancy. On the other hand, it can be confirmed that, in Comparative Examples 1 comprising too large amount of the room-temperature liquid-type phosphorus-based fire retardant, hardness and mechanical properties (elongation) are negatively affected. In addition, it can be confirmed that, in Comparative Examples 2 to 4 not comprising the room-temperature liquid-type phosphorus-based fire retardant, cable extrusion characteristics, mechanical characteristics and fire retardancy are all deteriorated. That is, it can be judged that use of the room-temperature liquid-type phosphorus-based fire retardant according to the present invention affects cable processability and surface characteristics, which are related to dispersibility of other solid-phase fire retardants. In addition, it can be judged that the dispersibility is closely related to fire retardancy. On the other hand, it can be confirmed that, in the case of Reference Examples 2 in which, in spite of application of the room-temperature liquid-type phosphorus-based fire retardant, a large amount of melamine polyphosphate as a nitrogen-based fire retardant that is a solid at room-temperature is used, hardness is slightly increased, but extrudability and cable surface characteristics are not good, tensile strength and elongation are negatively affected, and fire retardancy is also deteriorated. In particular, it can be confirmed that, when melamine polyphosphate is used as a nitrogen-based fire retardant being a solid at room-temperature, application of 13% by weight or less of the melamine polyphosphate (based on 19 to 21% by weight in total of fire retardant) leads to stable properties. In addition, it can be confirmed that, in Reference Examples 1 comprising a small amount of the room-temperature liquid-type phosphorus-based fire retardant, exhibition of fire retardancy is limited and a surface of an obtained cable is also not good.

Based on the results, it can be confirmed that, when the fire retardant resin composition according to the present invention comprises the room-temperature liquid-type fire retardant in a proper amount, other mechanical properties are superior with superior fire retardancy and satisfactory extrudability, whereby the fire retardant resin composition is suitable for preparation of a variety of molded products, particularly electric wires comprising cables, requiring fire retardancy.

What is claimed is:

1. A fire retardant thermoplastic resin composition consisting of:
   a matrix resin that comprises 20 to 35% by weight of a poly arylene ether resin, 20 to 35% by weight of a vinyl aromatic resin and 5 to 20% by weight of an olefin-based resin;
   4 to 7% by weight of a room-temperature liquid-type fire retardant;
   7 to 15% by weight of a nitrogen-based fire retardant;
   1 to 5% by weight of a second phosphorus-based fire retardant other than the room-temperature liquid-type fire retardant; and
   3.3 to 6.4% by weight of an additive, based on the total amount of the resin composition,
   wherein the additive comprises at least one selected from the group consisting of lubricant, thermostabilizer, antioxidant, anti-dripping agent and organic filler.

2. The fire retardant thermoplastic resin composition according to claim 1, wherein the olefin-based resin is selected from the group consisting of low-density polyethylene (LDPE), high-density polyethylene (HDPE), polypropylene and mixtures of two or more thereof.

3. The fire retardant thermoplastic resin composition according to claim 1, wherein the room-temperature liquid-type fire retardant is a room-temperature liquid-type phosphorus-based fire retardant.

4. The fire retardant thermoplastic resin composition according to claim 3, wherein the room-temperature liquid-type phosphorus-based fire retardant is selected from the group consisting of bisphenol-A-diphenyl phosphate (BPADP), triphenyl phosphate (TPP), resorcinol bis-diphenyl phosphate (RDP) and mixtures of two or more thereof.

5. The fire retardant thermoplastic resin composition according to claim 1, wherein the nitrogen-based fire retardant is one or more selected from the group consisting of melamine polyphosphate, melamine pyrophosphate and melamine phosphate.

6. The fire retardant thermoplastic resin composition according to claim 1, wherein the second phosphorus-based fire retardant is one or more selected from the group consisting of metal phosphate, a phosphorus ester compound, phosphate, pyrophosphate, phosphonate, metal-substituted phosphinate and phosphanate.

7. The fire retardant thermoplastic resin composition according to claim 6, wherein the metal phosphate is aluminium phosphate, zinc phosphate or a mixture thereof.

8. The fire retardant thermoplastic resin composition according to claim 1, wherein a melt index of the fire retardant thermoplastic resin composition is 40 to 150 g/10 min.

9. An electric wire comprising the fire retardant thermoplastic resin composition according to claim 1.

* * * * *